United States Patent [19]

Rudloff

[11] Patent Number: 4,466,372
[45] Date of Patent: Aug. 21, 1984

[54] LATEEN RIGGED SAILING BOARD

[76] Inventor: Lyle L. Rudloff, 122 Highland Ave., Portsmouth, R.I. 02871

[21] Appl. No.: 377,929

[22] Filed: May 13, 1982

[51] Int. Cl.³ .................. B62B 3/00; B63B 15/00
[52] U.S. Cl. ........................................ 114/39; 114/91; 280/87.04 A; 280/810
[58] Field of Search ............... 280/810, 87.04 A, 809; 180/180, 181; 114/102, 103, 90, 91, 43, 39; 441/74

[56] References Cited

U.S. PATENT DOCUMENTS

| | | | |
|---|---|---|---|
| 2,326,289 | 10/1943 | Shong | 114/90 |
| 2,364,578 | 12/1944 | Wilke | 114/90 |
| 4,200,302 | 4/1980 | de Rosnay | 280/87.04 A |
| 4,204,694 | 5/1980 | Freeman | 280/810 |
| 4,337,543 | 7/1982 | Vanulzan | 114/39 |

FOREIGN PATENT DOCUMENTS

| | | | |
|---|---|---|---|
| 847310 | 9/1960 | United Kingdom | 114/102 |
| 1551426 | 8/1979 | United Kingdom | 441/74 |
| 2017596A | 10/1979 | United Kingdom | 280/810 |

Primary Examiner—David M. Mitchell
Attorney, Agent, or Firm—Barlow & Barlow, Ltd.

[57] ABSTRACT

An improved lateen rigged sailing board is disclosed that basically combines a sailing board with a mast mounted thereon which is swivelly mounted to the upper surface of the sailing board, and which is provided with means to prevent the mast from completely falling forward. The mast is particularly configured with a wishbone or hoop-like section therein, through which the lateen sail is passed. The boom of the sail is secured within the lower portion of the hoop-like section, while the gaff of the sail is hoisted toward the upper portion of the hoop-like section by a halyard that may conveniently pass through the upper end of the hoop-like section and be secured by a simple expedient of a cam cleat. The arrangement is such that the mast will allow the center-of-effort of the sail to be adjusted relative to the sailing board and allow the entire unit to be tacked through the wind and move upward.

2 Claims, 6 Drawing Figures

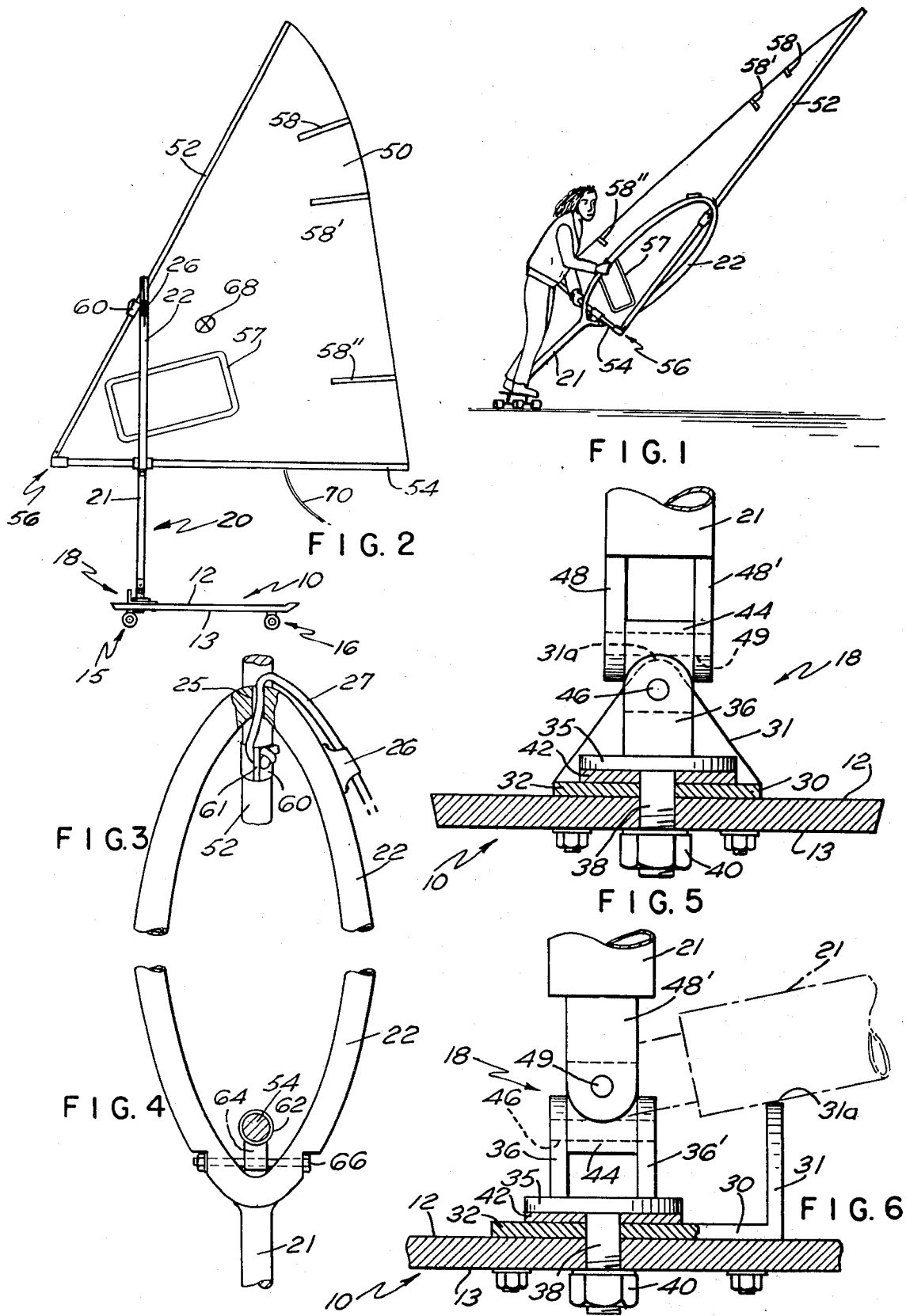

LATEEN RIGGED SAILING BOARD

BACKGROUND OF THE INVENTION

This invention relates in general to a sailing board which utilizes the forces of wind currents to propel the same. It has previously been suggested to propel skate boards with air currents, as for example is disclosed in U.S. Pat. No. 4,130,292. This prior art device has no provision for moving in other than a down wind direction. It is also known from the prior art to utilize a lateen rig as seen for example in British patent specification No. 847,310. This device, however, is shown in connection with a water borne vessel and does not provide for the removal of the sail gaff and boom, as the boom is below the wishbone, nor is the mast swivelly mounted relative to the vessel itself. Other forms of devices for use on boards are seen for example in U.S. Pat. No. 3,982,766, in German Published Specification No. 2,747,426, and in the latter case a single pole-like mast is swivelly mounted on the upper surface of a surf board, the peak of the sail being fixed to the top of the mast while the boom thereof is completely free of the mast. Also in U.S. Pat. No. 3,487,800, a curved wishbone boom and swivelly mounted mast is shown.

SUMMARY OF THE INVENTION

The present invention utilizes the combination of a sailing board and a sail which will propel the board. The mast is particularly arranged with a wishbone section or hoop-like section which allows a lateen sail to be fitted within this wishbone portion. It also permits the rider to hold on to the wishbone portion of the mast, as well as to hold on to the boom of the sail or to a sheet in the form of a line that may be attached to the boom. The rider will have his feet planted on the top surface of the board with one hand on the hoop-like section of the mast and the other hand on the boom or on the sheet, and by adjusting the angle of the mast as well as the angle of the boom, the center-of-effort of the sail can be controlled forward and backward, and it will enable the user to have complete control. The mast which is swivelly mounted on the top surface of the sailing board is prevented from falling forward of the board should the user lose control, and this will prevent injury to the user. The board itself may be provided with two pairs of wheels mounted on trucks, and it will be apparent that in using this type of skate board device the rider must maintain complete control, which is readily accomplished by the ease of gripping the mast and the boom. Furthermore, the mast and sail can readily control the movement of the sailing board by moving the center-of-effort of the sail either forward or rearwardly so that when the center-of-effort is rearwardly, the device will point well into the wind.

BRIEF DESCRIPTION OF THE DRAWINGS

FIG. 1 is a perspective view of the device of the invention in use.

FIG. 2 is a side elevational view of the skate board.

FIG. 3 is an enlarged view of the upper end of the wishbone portion of the mast, partly in section, showing the manner in which the gaff is attached to the mast.

FIG. 4 is an enlarged fragmentary view illustrating the lower portion of the hoop-like mast section, showing the manner in which the boom is secured thereto.

FIG. 5 is an enlarged rear elevational view showing the swivel that is affixed to the skate board.

FIG. 6 is an enlarged side elevational view of the swivel mounted on the skate board with the forward end of the skate board to the right of the figure.

DESCRIPTION OF THE PREFERRED EMBODIMENT

Referring to the drawings, and more particularly to FIG. 2, there is illustrated by way of example, of a sailing board, a skate board designated generally 10 which has an upper surface 12 and a lower surface 13. On the lower surface 13 there is mounted two pairs of wheels, generally designated 15 and 16, which are conventional skate board wheels mounted on trucks, such as the trucks seen in FIG. 1, of a construction which is well known to those skilled in the art. On the upper surface 12 of the skate board there is mounted a swivel means generally designated 18 which is more particularly seen in FIGS. 5 and 6 and will be presently described in more detail.

A mast generally designated 20 is provided with a lower polelike section 21 and an upper wishbone section 22, as seen more particularly in FIG. 3. The upper section of the wishbone section 22 is provided with an aperture 25, and on one side of the wishbone section is located a cam cleat 26. This arrangement allows a halyard 27 to pass through the aperture 25 and be secured in the cam cleat 26, which halyard will hoist the sail into position in a manner to be presently described.

Referring now to FIG. 5, the swivel arrangement 18 is seen in greater detail. Mounted on the upper surface 12 of the skate board is an L-shaped plate 30 which has an upstanding portion 31 and a horizontal portion 32, the latter of which is secured by bolts to the upper surface of the skate board. Resting on the horizontal portion 32 is a swivel plate 35 having a pair of upstanding ears 36, 36', which swivel plate has a bolt 38 that passes through the skate board and is loosely connected thereto as by an elastic stop nut or the like 40. Between the horizontal portion 32 and the swivel plate 35 is an anti-friction washer 42, which allows the swivel plate to freely turn.

Mounted between the upstanding ears 36, 36' is a block 44 which is pivoted to the ears 36, 36' by a pivot pin 46. Secured to the upper end of the block 44 and on an axis normal to the pivoting axis of the pin 46 are a pair of ears 48, 48' which are secured to the block by a pivot pin 49. Ears 48, 48' are secured to the lower end 21 of the mast and as will be readily apparent to one skilled in the art, this arrangement provides a universal action as well as a rotary action of the mast 20 relative to the surface of the skate board. It will be apparent to those skilled in the art that equivalent swivel means may be used, for example, a flexible tube may be affixed to the mast section 21 and to the swivel plate 35.

As will be seen more particularly in FIG. 6, the upstanding portion 31 of plate 30 is of a height sufficient so that if the mast 21 attempts to move clockwise as seen in FIG. 6, or toward the front of the skate board, it will hit the apex or one side of the apex 31a of the plate, as seen in dotted lines in FIG. 6, and the mast will now fall to one side of the other of the forward portion of the skate board. Thus, if the mast accidentally falls as one is traveling along, it may not fall forward to create an immediate stopping action of the sailing board, but will allow the mast to fall to one side or the other of the board and prevent any injury to the user thereof.

The sail 50 is provided with a gaff 52 and a boom 54 which meet at an apex generally designated 56 by a pivoting joint. The sail, which may be made of a variety of materials, can be secured to the boom and the gaff in a variety of ways well known to those skilled in the art, and the body thereof may be provided with a clear viewing window designated 57, which allows the user of the device to be able to see through the sail if the sail is opaque. Further, in order to maintain a proper shape to the sail, a plurality of battens, such as 58,58',58'', are provided. The gaff 52 is provided with a sleeve 60, which has an ear 61 thereon, through which the halyard 27 may be fastened (see FIG. 3). In addition, as seen in FIG. 4 the boom 54 is likewise provided with a sleeve 62 which has a boss 64 extending therefrom with an aperture therethrough. Further as will be seen in FIG. 4 the boom is secured to the lower portion of the wishbone section by a bolt 66 that passes through the wishbone section and through the aperture in the boss 64. In this fashion a stable arrangement is provided for the gaff and boom relative to the mast.

From the above, it will be apparent that the gaff and boom are located within the hoop or wishbone section of the mast. This arrangement allows for ease in assembly and disassembly as the gaff may be lowered, the boom disconnected and the sail and spars readily removed in one bundle. With the mast disconnected from the sailing board, the sail, gaff and boom make a convenient bundle for transport. In addition, with the boom pivoted to the lower inner portion of the hoop or wishbone, the camber of the sail may be easily changed by adjusting the gaff halyard and then manually pivoting the boom in the vertical plane of the mast.

As has been briefly eluded to above, a sail such as 50 has a center-of-effort which is approximately located as seen by the cross designated 68 in FIG. 2. It is the point of center-of-effort which determines the vector or driving forces for a sailing device. As the center of effort is moved relative to the surface of the board, various functions may be achieved. For example, if the mast 20 is moved forward, the center-of-effort is moved forward and this will enable the user to gain control of the device. The user may then move the mast toward the rear end of the board, and as the center-of-effort is moved toward this rear end, the user will find that he is able to move close to the wind, that is, tack into the wind, in sailors' vernacular. This analysis holds true for the rig used on a water-borne board. For a board used on land with wheel trucks, as illustrated, the major control of direction will be in the manner the user "leans" and applies pressure to the wheels. Further, in a skate board, as the speed increases, the shape of the sail will change and actually the center-of-effort 68 will move toward the mast.

As seen in FIG. 1, the user may readily grasp the boom 54 with one hand and also grasp the wishbone section 22 with his other hand, and have full control of the device at all times. In some situations it may be desirable to move down wind and for this purpose, a short sheet such as 70 as seen in FIG. 2 may be provided to allow the boom to be extended away from the person using the device to a further amount. The great advantage of the rig disclosed herein lies in the fact that one hand is on the mast and the other hand grasps the boom. If a gust of wind strikes the sail, the boom may be released; the mast stays under control with a luffing sail. This is in contrast to the arrangement used in U.S. Pat. No. 3,487,800 where both hands are on a wishbone boom, and under similar circumstances the rig must be dropped into the water to avoid capsize, (see column 4, lines 6–11).

For tacking, the swivel arrangement allows the mast to be pivoted forwardly, which action, raises the boom and allows the user to move under the boom to the other side of the board.

I claim:

1. A lateen rigged sailing board comprising an elongated board having a forward and rear end with an upper and lower surface, a swivel member mounted on the upper surface near the forward end of said board, a mast, said mast having a hoop-like upper section and a substantial pole-like lower section, said lower section being affixed to the swivel member, restraining means associated with the swivel whereby the mast in a horizontal plane may swivel only in an arc of substantially 300°, a sail having a gaff and a boom meeting at a point to define a lateen configuration, said gaff passing through said hoop and being supported at the upper inner portion of the hoop-like mast portion by a halyard, said boom passing through said hoop, pivoted fastening means at the lower portion of the hoop, said boom being supported at the lower inner portion of said hoop section by said pivotal fastening means whereby the user may grasp the hoop with one hand and the boom with the other hand.

2. A lateen rigged sailing board as the claim 1 wherein the restraining means is a vertical plate rising from the forward end of said board ahead of said swivel to prevent the mast from freely falling ahead of said board, said plate having a substantially triangular shape whereby when the mast strikes the plate, the mast will fall to one side or the other of the board.

* * * * *